United States Patent [19]

Gould et al.

[11] 4,261,241

[45] Apr. 14, 1981

[54] MUSIC TEACHING DEVICE AND METHOD

[76] Inventors: Murray J. Gould, 10649 Montrose Ave., Bethesda, Md. 20014; John J. Giganti, 19445 Olney Mill Rd., Olney, Md. 20832

[21] Appl. No.: 832,943

[22] Filed: Sep. 13, 1977

[51] Int. Cl.³ .................. G09B 15/04; G10H 3/06
[52] U.S. Cl. ............................... 84/1.18; 84/483 A
[58] Field of Search .................. 84/1.01, 1.18, 470 R, 84/477 R, 483 R, 483 A, 1.28; 235/472

[56] References Cited

U.S. PATENT DOCUMENTS

| | | | |
|---|---|---|---|
| 3,376,778 | 4/1968 | Musser | 84/483 R |
| 3,424,851 | 1/1969 | Weitzner | 84/1.28 |
| 3,460,425 | 8/1969 | Kiepe | 84/470 R |
| 3,484,530 | 12/1969 | Rupert | 84/1.18 |
| 3,592,098 | 7/1971 | Zadig | 84/483 R X |
| 3,652,776 | 3/1972 | Milde, Jr. | 84/1.28 |
| 3,660,587 | 5/1972 | Martin | 84/1.18 |
| 3,784,794 | 1/1974 | Allais | 235/472 |
| 3,892,974 | 7/1975 | Ellefson et al. | 235/472 X |
| 4,028,977 | 6/1977 | Ryeczek | 84/1.18 X |
| 4,145,945 | 3/1979 | Iyeta | 84/1.18 |

*Primary Examiner*—Stanley J. Witkowski
*Attorney, Agent, or Firm*—Cantor and Singer

[57] ABSTRACT

A device for teaching music using coded indicia representing musical notes and being scannable, a scanning wand and circuits for decoding the signals from the scanning wand and producing audible tones of the proper pitch.

12 Claims, 2 Drawing Figures

MUSIC TEACHING DEVICE AND METHOD

BACKGROUND OF THE INVENTION

This invention relates to educational devices, and more particularly this invention relates to a device and method for facilitating the teaching of music.

Education, generally, relies on the ability of the teacher to convey ideas and concepts which range from the physical or tangible to extremely abstract. In teaching, and conversely in learning, the various senses of sight, touch, smell, and hearing are brought into play. It is fairly easy to convey ideas relating to tangible things, such as viewing an object or a picture of an object and associating a name with the object. Conveying abstract ideas is considerably more difficult. Such concepts as those of color or smell can be conveyed by literally bringing into play the senses of sight and smell. For instance, a teacher can show a student something colored green and tell him this color is green and the concept will, eventually, be learned. Similarly, a teacher can ask a student to smell an onion and, eventually, the student will associate the particular smell with the object.

But, when dealing with aural concepts, it is more difficult to provide the associations necessary for a student to learn what is being taught. Similarly, there is no natural concrete way to convey the concepts. But, a system of musical notation has been developed over the years and, in fact, has been commonly used for many years and is accepted now as the standard notation. Teaching of music to students who are familiar with, and understand, standard musical notation is widespread. There has been a need for many years for methods of teaching the cognitive content of music without the need of manual skills and without the need for the student to understand musical notation.

There have been attempts at fulfilling this need using various complex electrical circuitry and bulky structures in conjunction with musical notation. These devices have not been satisfactory due to the complicated and expensive structures involved. There have been other devices which would lend themselves to assisting in the teaching of music, these devices being based on magnetic recording strips superimposed upon pages of printed matter. It is necessary to use a device which reads the magnetic signal by relative motion across the magnetic strip and converts it into sound. None of these devices of the prior art has fulfilled the need for a way to teach music utilizing simply manufactured material which can be made using standard printing equipment.

SUMMARY OF THE INVENTION

It is, therefore, a primary object of the present invention to provide a method and means for teaching music which is free of the aforementioned and other such disadvantages.

It is another object of the present invention to provide a music teaching system based on simple, easily reproduceable scannable encoded indicia.

It is a further object of the present invention to provide a music teaching device which is simple and inexpensive to manufacture.

It is yet another object of the present invention to provide a method of teaching wherein it is not necessary for the student to have any particular knowledge of music.

It is still another object of the present invention to provide a system based on optically scannable encoded indicia for scanning said indicia and converting the resulting signals to audible tones.

Consistent with the foregoing objects, the present invention provides scannable encoded indicia representative of particular discrete musical tones, means for scanning the indicia to create an electrical signal characteristic thereof, and means for converting the electrical signal to a musical tone. The method of the instant invention comprises providing the scannable encoded indicia, the means for scanning the indicia, and means for converting the resulting electrical signal to an audible tone.

In a preferred aspect of the present invention, bar codes are used as the indicia and, as will be discussed hereinbelow, a particular relationship between certain bar codes and musical notes has been developed and constitutes an important advance in the pedagogical arts.

BRIEF DESCRIPTION OF THE DRAWING

This invention will be better understood, and objects other than those set forth above will become apparent when consideration is given to the following detailed description thereof which makes reference to the annexed drawing wherein.

DETAILED DESCRIPTION OF THE INVENTION

Figure 1:
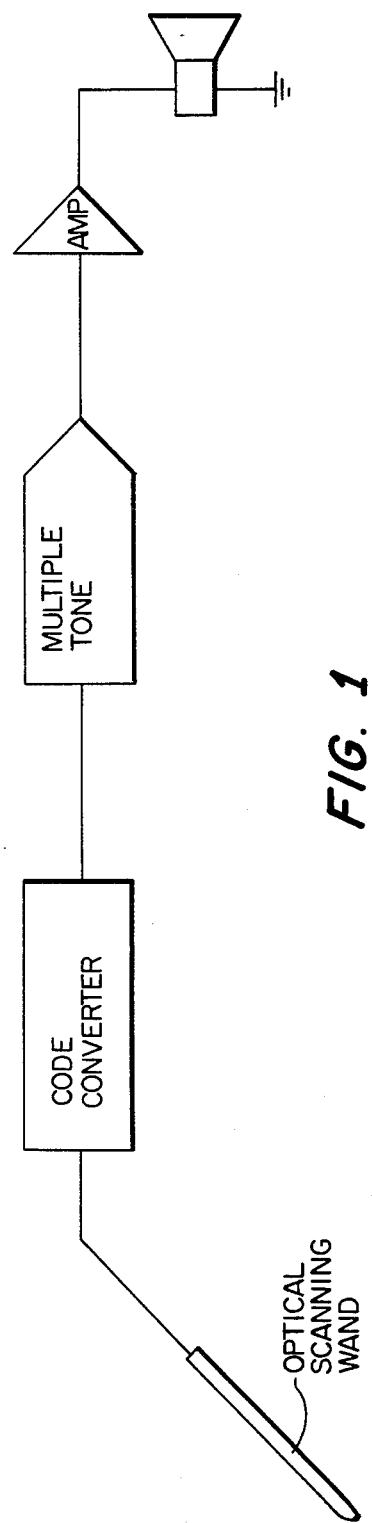
FIG. 1 is a block diagram of the apparatus of the invention.

The instant invention provides a device for teaching music which comprises a music sheet comprising a substrate having coded indicia thereon corresponding to particular sound frequencies, or musical notes, means for scanning the indicia to generate an electrical signal characteristic of each of the indicia, and means for converting the electrical signal to audible tones of the selected frequencies. In its preferred form, the indicia are optically scannable so that the scanning means would be optical scanning means. Referring to FIG. 1, the device of the invention is depicted in schematic form showing an optical scanning wand which is passed across the encoded indicia in the usual way. The optical scanning wand generates an electrical signal which passes to the code converter or decoder. It is apparent to one skilled in the art that the signals passing from the optical scanning wand and from the code converter are digital signals. The signal from the code converter then passes to a multiple tone generator which produces the proper signal indicative of the musical tone being produced. This signal is then amplified and sent to a loud speaker or other conventional equivalent thereof. It is preferred that a controllable latch circuit also be included so that the audible signal being emitted from the tone generator will continue until the wand is lifted from the substrate. The circuitry involved is conventional and would be quite apparent to one skilled in the art.

As has already been made clear, the invention relies on optically scannable coded indicia. The preferred such indicia at the present time are so-called "bar codes". Bar codes per se are well-known in the art but have not heretofore been used either as a teaching device or for the production or reproduction of music.

The advantage of bar codes is that lightweight, relatively inexpensive, hand-held scanning wands or probes are commercially available. The particular probe used in the best mode of practicing the invention presently known to me is the "INTERMEC" Model 1232 Light Pen available from Interface Mechanisms, Inc. of Seattle, Wash. The operation of this probe is described in U.S. Pat. No. 3,784,794 and U.S. Pat. No. 3,892,974, both of which are embodied herein by reference. Basically, the probe includes a light source and an associated detector, the probe differentiating between successive bars and spaces of a bar code by detecting the varying amounts of light reflected therefrom and converting the detected light into corresponding voltage levels as an output signal. The amplified output signal from the probe may be conveniently applied to additional conventional code reader circuitry taking into account that the output of the built-in amplifier is a varying voltage signal characterized by relatively sharp transitions between alternating positive and negative peaks, the amplitude of the respective peaks being proportional to the amount of light reflected from the scanned data bits.

As has already been established, the signal from the optical scanning wand is decoded or converted to a signal suitable for the tone generator to produce the appropriate signal for generating an audible tone. The actual circuitry for performing these functions is conventional and can easily be assembled by one skilled in the art. For instance, in one form of a suitable device, standard integrated circuits were used for the various modules. A National Semiconductor ISP 8/600N data processing chip was used and suitably programmed in a manner well-known to those skilled in the art to decode the signal from the light pen which was passed through a voltage comparator circuit which then provided the input to the decoding module. The processor chip was appropriately connected to address decoder, read only memory, and random access memory chips which were, respectively, Intel 8111-2 Intel 8111-2 and Intel 8702-A integrated circuit chips. The digital signal emanating from the decoder was passed through a digital to analog converter latch and then to a digital to analog converter. The digital to analog converter was a Motorola MC 1408/L6 integrated circuit chip and the digital to analog converter latch was represented by a pair of RCA CD4042AE integrated circuit chips. The outputs of the digital to analog converter was passed to a power amplifier and from there to a 3" eight ohm loud speaker. The power amplifier included a National Semiconductor integrated circuit chip LM 386N. The output signal to the power amplifier is a triangular signal and an integrating capacitor is, therefore, included between the digital to analog converter and the power amplifier to smooth the signal.

In operation, as will be appreciated by one skilled in the art, the input to the decoder is the signal from the light pen or probe. The output of the pen is an electrical signal having a magnitude of approximately 100 mv under reflective situations and 0–10 mv when the pen is held either directly over a black line or completely off the paper. Because the actual values of output voltages will vary depending on the actual reflectance of the substrate, preferably paper, and blackness of the lines, it is necessary to employ a threshold comparator to change the light pen signal into an output suitable for digital logic circuits. When a bar code, the preferred such bar codes being an eight bar sequence, is scanned by the probe, the output of the threshold comparator is a sequential logic signal electrically analogous to the optical bars. The first logic transition is generated by the first black bar crossed. This initiates the decoding cycle which compares the ratio of subsequent light to dark transition times to thereby determine the actual input. If a wide bar is followed by a narrow space, for example, the input is a logical "1". The opposite, that is, a narrow bar followed by a wide space would be decoded as a "0". Since only ratios of time spent upon adjacent bars is important, the actual pen velocity is not critical in the bar coding scanning. The scanning cycle must encode eight bars before the processor will automatically jump to the pitch generator cycle. If an error is made in reading, the pen must be lifted off the page of re-initiate the scanning cycle and then the code may be read again.

At the end of the decoding cycle, the processor has stored in the random access memory an eight bit binary number corresponding to the bar code just scanned. The processor then performs a look-up operation in the read only memory which has stored the particular timing requirements of the selected number of notes, the number of which is limited only by the capacity of the memory circuit and the number of possible combinations using the eight bar code. The selected note timing value is transferred to the accumulator, or latch, and becomes the output to the digital to analog converter causing a current to flow to the integrating capacitor, causing the output of the capacitor to increase linearly with time. At a time corresponding to $\frac{1}{2}$ f (a half cycle), the accumulator is logically complemented an once again provides output to the digital to analog converter. This causes a reverse current to flow in the integrating capacitor causing its voltage to decrease linearly with time. It should be noted that the accumulator value which determines the actual current and thus the integration slope must be different for each note since the integration time is different for each note. Repetition of the process of accumulator outputting and complimentation at $\frac{1}{2}$ f results in a triangular electrical signal having uniform amplitude at a frequency f at the integrating capacitor. The power amplifier provides an output level sufficient to drive a small permanent magnet speaker. The duration of the pitch is from the time of crossing the last bar of the eight bar sequence to either lifting the pen or crossing the first bar of a new sequence.

Of course, it will be easily recognized by those skilled in the art that other equivalent circuitry could be used and that additional circuitry could be provided to continue a particular pitch while another bar code is scanned to provide a signal indicative of a second pitch whereby the two pitches would be superimposed and would play a chord. Various other modifications which are well within the skill of the art will be quite apparent.

Figure 2:
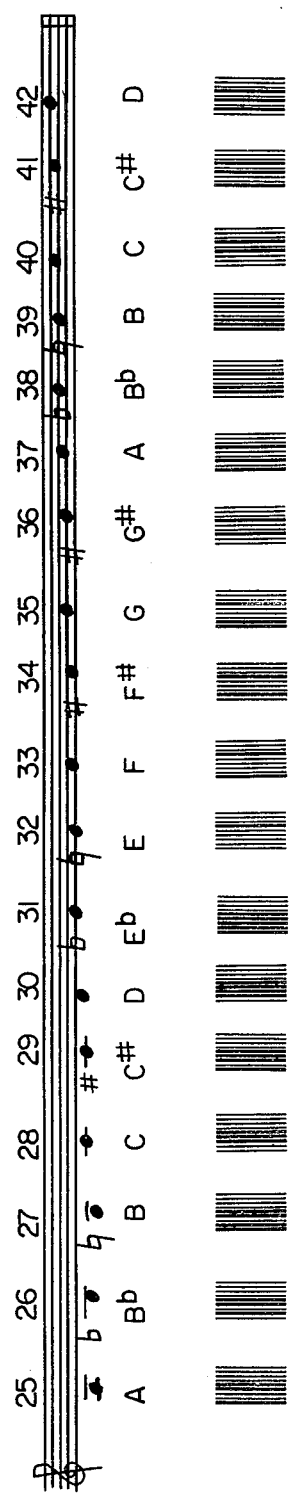
FIG. 2 shows the relationship between standard musical notation and the bar codes used in the present invention.

Turning to a consideration of the bar code, and referring to FIG. 2 for a representative sampling of particular bar codes associated with particular musical notes, it will be readily apparent to one skilled in the art that bar codes are, in essence, a graphical representation of a binary codes so that, taking a narrow bar followed by a wide space as representative of "0" and a wide bar followed by a narrow space as representative of "1" the bar code could easily be represented by a binary number system. Thus, the bar code shown in FIG. 2 as representing an A and numbered 25, could be written in a binary code as "00011001". In order to practice the preferred aspect of the instant invention, particular bar codes have been assigned to particular notes and these are shown, in binary code fashion, in Table I wherein the notes are numbered from 1 to 60 and the frequency in Hertz is given for each note as well as the binary representation of the corresponding bar code. Referring to FIG. 2 and comparing the same with Table I, it will be seen that the equivalencies denoted as 25 through 42 are represented in FIG. 2 for illustrative purposes. It will also be appreciated that the binary representation shown in Table I is identical to the bar code shown in FIG. 2.

TABLE I

| Number | Note | Frequency (Hz) | Binary Code |
|---|---|---|---|
| 1 | $A_1$ | 55.00 | 00000001 |
| 2 | $A\#_1$ | 58.27 | 00000010 |
| 3 | $B_1$ | 61.74 | 00000011 |
| 4 | $C_2$ | 65.41 | 00000100 |
| 5 | $C\#_2$ | 69.30 | 00000101 |
| 6 | $D_2$ | 73.42 | 00000110 |
| 7 | $D\#_2$ | 77.78 | 00000111 |
| 8 | $E_2$ | 82.41 | 00001000 |
| 9 | $F_2$ | 87.31 | 00001001 |
| 10 | $F\#_2$ | 92.50 | 00001010 |
| 11 | $G_2$ | 98.00 | 00001011 |
| 12 | $G\#_2$ | 103.83 | 00001100 |
| 13 | $A_2$ | 110.00 | 00001101 |
| 14 | $A\#_2$ | 116.54 | 00001110 |
| 15 | $B_2$ | 123.47 | 00001111 |
| 16 | $C_3$ | 130.81 | 00010000 |
| 17 | $C\#_3$ | 138.59 | 00010001 |
| 18 | $D_3$ | 146.83 | 00010010 |
| 19 | $D\#_3$ | 155.56 | 00010011 |
| 20 | $E_3$ | 164.81 | 00010100 |
| 21 | $F_3$ | 174.61 | 00010101 |
| 22 | $F\#_3$ | 185.00 | 00010110 |
| 23 | $G_3$ | 196.00 | 00010111 |
| 24 | $G\#_3$ | 207.65 | 00011000 |
| 25 | $A_3$ | 220.00 | 00011001 |
| 26 | $A\#_3$ | 233.08 | 00011010 |
| 27 | $B_3$ | 246.94 | 00011011 |
| 28 | $C_4$ | 261.63 | 00011100 |
| 29 | $C\#_4$ | 277.18 | 00011101 |
| 30 | $D_4$ | 293.66 | 00011110 |
| 31 | $D\#_4$ | 311.13 | 00011111 |
| 32 | $E_4$ | 329.63 | 00100000 |
| 33 | $F_4$ | 349.23 | 00100001 |
| 34 | $F\#_4$ | 369.99 | 00100010 |
| 35 | $G_4$ | 392.00 | 00100011 |
| 36 | $G\#_4$ | 415.30 | 00100100 |
| 37 | $A_4$ | 440.00 | 00100101 |
| 38 | $A\#_4$ | 466.16 | 00100110 |
| 39 | $B_4$ | 493.88 | 00100111 |
| 40 | $C_5$ | 523.25 | 00101000 |
| 41 | $C\#_5$ | 554.37 | 00101001 |
| 42 | $D_5$ | 587.33 | 00101010 |
| 43 | $D\#_5$ | 622.25 | 00101011 |
| 44 | $E_5$ | 659.26 | 00101100 |
| 45 | $F_5$ | 698.46 | 00101101 |
| 46 | $F\#_5$ | 739.99 | 00101110 |
| 47 | $G_5$ | 783.99 | 00101111 |
| 48 | $G\#_5$ | 830.61 | 00110000 |
| 49 | $A_5$ | 880.00 | 00110001 |
| 50 | $A\#_5$ | 932.33 | 00110010 |
| 51 | $B_5$ | 987.77 | 00110011 |
| 52 | $C_6$ | 1046.50 | 00110100 |
| 53 | $C\#_6$ | 1108.73 | 00110101 |
| 54 | $D_6$ | 1174.66 | 00110110 |
| 55 | $D\#_6$ | 1244.51 | 00110111 |
| 56 | $E_6$ | 1318.51 | 00111000 |
| 57 | $F_6$ | 1396.91 | 00111001 |
| 58 | $F\#_6$ | 1479.98 | 00111010 |
| 59 | $G_6$ | 1567.98 | 00111011 |
| 60 | $G\#_6$ | 1661.22 | 00111100 |

It will be appreciated that while the bar code chosen and used herein is an eight bar code, it is within the scope of this invention to use a bar code having a greater or lesser number of bars, the only difference being the number of possible combinations available.

Also, by referring to the codes shown in FIG. 2, it will be noted that there are actually nine bars depicted. The reason for this is that in referring to the code as an "eight bar" code, what is actually meant is a code containing eight combinations of bars and spaces. Thus, a space of a discrete size must follow the eighth bar and, for this purpose, a ninth bar is inserted thereby delineating the limit of the last space. The combination of a ninth bar and an infinite space is indicative of the end of the eight bar scan. The signal from the wand, therefore, indicates that the scan is complete.

It will also be appreciated with while this invention has been described with reference to music teaching, it is equally applicable to toys and puzzles and even to a performing instrument whereby the output of the device can be passed to a synthesizer or amplifying equipment. Furthermore, by appropriate modifications to the circuitry, the device can be made to generate pitch, harmonies, or waveforms.

It is pointed out that although the bar has been described as being a combination of a bar and a space for each element of the code, the scanning wand actually performs a reading operation comparing the dark area, or bar, with the light area, or space. The same result can be accomplished by using a so-called "uniform bar code" wherein each bar has the same width, but the spaces differ in width. This the wand would scan space width as delineated by two bars, regardless of bar width. The binary codes in Table I which represent particular bars can equally well represent corresponding codes in the uniform bar code system. It will also be appreciated that while "scanning" has been described by reference to movement of the wand over the indicia-obtaining substrate, the invention is satisfied by movement of the substrate while holding the wand stationary. Thus, "scanning" is defined as relative movement between the wand and the substrate.

It should be apparent from the foregoing detailed description that the objects set forth hereinabove have been successfully achieved. Moreover, while there are shown and described present preferred embodiments of the invention, it is to be distinctly understood that the invention is not limited thereto but may be otherwise variously embodied and practiced within the scope of the followings claims.

Accordingly, what is claimed is:

1. In combination a music sheet comprising a reflective substrate having at least partially non-reflective, reflectively optically scannable, reflectively optically readable, digitally coded indicia thereon representing particular discrete sound frequencies corresponding to musical notes, and an electro-optical reader comprising a light source and a light detector.

2. The combination as defined in claim 1, wherein said indicia are bar codes.

3. The combination as defined in claim 2, wherein said bar codes correspond to said musical notes according to the relationships set forth in the following Table:

| Number | Note | Frequency (Hz) | Binary Code |
|---|---|---|---|
| 1 | $A_1$ | 55.00 | 00000001 |
| 2 | $A\#_1$ | 58.27 | 00000010 |
| 3 | $B_1$ | 61.74 | 00000011 |
| 4 | $C_2$ | 65.41 | 00000100 |
| 5 | $C\#_2$ | 69.30 | 00000101 |
| 6 | $D_2$ | 73.42 | 00000110 |

-continued

| Number | Note | Frequency (Hz) | Binary Code |
|---|---|---|---|
| 1 | $A_1$ | 55.00 | 00000001 |
| 2 | $A\#_1$ | 58.27 | 00000010 |
| 3 | $B_1$ | 61.74 | 00000011 |
| 4 | $C_2$ | 65.41 | 00000100 |
| 5 | $C\#_2$ | 69.30 | 00000101 |
| 6 | $D_2$ | 73.42 | 00000110 |
| 7 | $D\#_2$ | 77.78 | 00000111 |
| 8 | $E_2$ | 82.41 | 00001000 |
| 9 | $F_2$ | 87.31 | 00001001 |
| 10 | $F\#_2$ | 92.50 | 00001010 |
| 11 | $G_2$ | 98.00 | 00001011 |
| 12 | $G\#_2$ | 103.83 | 00001100 |
| 13 | $A_2$ | 110.00 | 00001101 |
| 14 | $A\#_2$ | 116.54 | 00001110 |
| 15 | $B_2$ | 123.47 | 00001111 |
| 16 | $C_3$ | 130.81 | 00010000 |
| 17 | $C\#_3$ | 138.59 | 00010001 |
| 18 | $D_3$ | 146.83 | 00010010 |
| 19 | $D\#_3$ | 155.56 | 00010011 |
| 20 | $E_3$ | 164.81 | 00010100 |
| 21 | $F_3$ | 174.61 | 00010101 |
| 22 | $F\#_3$ | 185.00 | 00010110 |
| 23 | $G_3$ | 196.00 | 00010111 |
| 24 | $G\#_3$ | 207.65 | 00011000 |
| 25 | $A_3$ | 220.00 | 00011001 |
| 26 | $A\#_3$ | 233.08 | 00011010 |
| 27 | $B_3$ | 246.94 | 00011011 |
| 28 | $C_4$ | 261.63 | 00011100 |
| 29 | $C\#_4$ | 277.18 | 00011101 |
| 30 | $D_4$ | 293.66 | 00011110 |
| 31 | $D\#_4$ | 311.13 | 00011111 |
| 32 | $E_4$ | 329.63 | 00100000 |
| 33 | $F_4$ | 349.23 | 00100001 |
| 34 | $F\#_4$ | 369.99 | 00100010 |
| 35 | $G_4$ | 392.00 | 00100011 |
| 36 | $G\#_4$ | 415.30 | 00100100 |
| 37 | $A_4$ | 440.00 | 00100101 |
| 38 | $A\#_4$ | 466.16 | 00100110 |
| 39 | $B_4$ | 493.88 | 00100111 |
| 40 | $C_5$ | 523.25 | 00101000 |
| 41 | $C\#_5$ | 554.37 | 00101001 |
| 42 | $D_5$ | 587.33 | 00101010 |
| 43 | $D\#_5$ | 622.25 | 00101011 |
| 44 | $E_5$ | 659.26 | 00101100 |
| 45 | $F_5$ | 698.46 | 00101101 |
| 46 | $F\#_5$ | 739.99 | 00101110 |
| 47 | $G_5$ | 783.99 | 00101111 |
| 48 | $G\#_5$ | 830.61 | 00110000 |
| 49 | $A_5$ | 880.00 | 00110001 |
| 50 | $A\#_5$ | 932.33 | 00110010 |
| 51 | $B_5$ | 987.77 | 00110011 |
| 52 | $C_6$ | 1046.50 | 00110100 |
| 53 | $C\#_6$ | 1108.73 | 00110101 |
| 54 | $D_6$ | 1174.66 | 00110110 |
| 55 | $D\#_6$ | 1244.51 | 00110111 |
| 56 | $E_6$ | 1318.51 | 00111000 |
| 57 | $F_6$ | 1396.91 | 00111001 |
| 58 | $F\#_6$ | 1479.98 | 00111010 |
| 59 | $G_6$ | 1567.98 | 00111011 |
| 60 | $G\#_6$ | 1661.22 | 00111100 |

4. A music teaching device comprising a music sheet which comprises a reflective substrate having optically scannable coded indicia thereon corresponding to particular sound frequencies, said indica being at least partially non-reflective, means for optically scanning said indicia, said scanning means including a source of light directed upon said substrate and indicia and means for detecting the presence of reflected light from said substrate and the absence of reflected light from said at least partially non-reflective indicia to generate an electrical signal characteristic of each of said indicia, and means for converting said electrical signals to audible tones of said particular frequencies.

5. A music teaching device as defined in claim 4, wherein said optically scannable indicia are bar codes.

6. A music teaching device as defined in claim 5, wherein said bar codes correspond to musical notes according to the relationships set forth in the following table:

7. A method of teaching music comprising providing a reflective substrate having optically scannable coded indicia thereon corresponding to particular musical notes, said indicia being at least partially non-reflective, providing means for optically scanning said indicia, said scanning means including a source of light directed upon said substrate and indicia and means for detecting the presence of reflected light from said substrate and the absence of reflected light from said at least partially non-reflective indicia to generate an electrical signal characteristic of each of said indicia, and providing means for converting said electrical signals to audible tones characteristic of said musical notes.

8. A method as defined in claim 7, wherein said indicia are bar codes.

9. A method as defined in claim 8, wherein said bar codes correspond to said musical notes according to the relationships set forth in the following table:

| Number | Note | Frequency (Hz) | Binary Code |
|---|---|---|---|
| 1 | $A_1$ | 55.00 | 00000001 |
| 2 | $A\#_1$ | 58.27 | 00000010 |
| 3 | $B_1$ | 61.74 | 00000011 |
| 4 | $C_2$ | 65.41 | 00000100 |
| 5 | $C\#_2$ | 69.30 | 00000101 |
| 6 | $D_2$ | 73.42 | 00000110 |
| 7 | $D\#_2$ | 77.78 | 00000111 |
| 8 | $E_2$ | 82.41 | 00001000 |
| 9 | $F_2$ | 87.31 | 00001001 |
| 10 | $F\#_2$ | 92.50 | 00001010 |
| 11 | $G_2$ | 98.00 | 00001011 |
| 12 | $G\#_2$ | 103.83 | 00001100 |
| 13 | $A_2$ | 110.00 | 00001101 |
| 14 | $A\#_2$ | 116.54 | 00001110 |
| 15 | $B_2$ | 123.47 | 00001111 |
| 16 | $C_3$ | 130.81 | 00010000 |
| 17 | $C\#_3$ | 138.59 | 00010001 |
| 18 | $D_3$ | 146.83 | 00010010 |
| 19 | $D\#_3$ | 155.56 | 00010011 |
| 20 | $E_3$ | 164.81 | 00010100 |
| 21 | $F_3$ | 174.61 | 00010101 |
| 22 | $F\#_3$ | 185.00 | 00010110 |
| 23 | $G_3$ | 196.00 | 00010111 |
| 24 | $G\#_3$ | 207.65 | 00011000 |
| 25 | $A_3$ | 220.00 | 00011001 |
| 26 | $A\#_3$ | 233.08 | 00011010 |
| 27 | $B_3$ | 246.94 | 00011011 |
| 28 | $C_4$ | 261.63 | 00011100 |
| 29 | $C\#_4$ | 277.18 | 00011101 |
| 30 | $D_4$ | 293.66 | 00011110 |
| 31 | $D\#_4$ | 311.13 | 00011111 |
| 32 | $E_4$ | 329.63 | 00100000 |
| 33 | $F_4$ | 349.23 | 00100001 |
| 34 | $F\#_4$ | 369.99 | 00100010 |
| 35 | $G_4$ | 392.00 | 00100011 |
| 36 | $G\#_4$ | 415.30 | 00100100 |
| 37 | $A_4$ | 440.00 | 00100101 |
| 38 | $A\#_4$ | 466.16 | 00100110 |
| 39 | $B_4$ | 493.88 | 00100111 |
| 40 | $C_5$ | 523.25 | 00101000 |
| 41 | $C\#_5$ | 554.37 | 00101001 |
| 42 | $D_5$ | 587.33 | 00101010 |
| 43 | $D\#_5$ | 622.25 | 00101011 |
| 44 | $E_5$ | 659.26 | 00101100 |
| 45 | $F_5$ | 698.46 | 00101101 |
| 46 | $F\#_5$ | 739.99 | 00101110 |
| 47 | $G_5$ | 783.99 | 00101111 |
| 48 | $G\#_5$ | 830.61 | 00110000 |
| 49 | $A_5$ | 880.00 | 00110001 |
| 50 | $A\#_5$ | 932.33 | 00110010 |
| 51 | $B_5$ | 987.77 | 00110011 |
| 52 | $C_6$ | 1046.50 | 00110100 |
| 53 | $C\#_6$ | 1108.73 | 00110101 |
| 54 | $D_6$ | 1174.66 | 00110110 |
| 55 | $D\#_6$ | 1244.51 | 00110111 |
| 56 | $E_6$ | 1318.51 | 00111000 |
| 57 | $F_6$ | 1396.91 | 00111001 |
| 58 | $F\#_6$ | 1479.98 | 00111010 |
| 59 | $G_6$ | 1567.98 | 00111011 |
| 60 | $G\#_6$ | 1661.22 | 00111100 |

10. A method of generating musical tones comprising providing a reflective substrate having optically scannable coded indicia thereon corresponding to particular sound frequencies, said indicia being at least partially non-reflective, scanning said indicia with optical scanning means, said scanning means including a source of light directed upon said substrate and indicia and means for detecting the presence of reflected light from said substrate and the absence of reflected light from said at least partially non-reflective indicia to generate an electrical signal characteristic of each of said indicia and converting said electrical signals to audible tones corresponding to said musical notes.

11. A method of generating musical tones as defined in claim 10, wherein said indicia are bar codes.

12. A method of generating musical tones as defined in claim 11, wherein said bar codes correspond to said musical notes according to the relationship set forth in the following Table:

| Number | Note | Frequency (Hz) | Binary Code |
|---|---|---|---|
| 1 | $A_1$ | 55.00 | 00000001 |
| 2 | $A\#_1$ | 58.27 | 00000010 |
| 3 | $B_1$ | 61.74 | 00000011 |
| 4 | $C_2$ | 65.41 | 00000100 |
| 5 | $C\#_2$ | 69.30 | 00000101 |
| 6 | $D_2$ | 73.42 | 00000110 |
| 7 | $D\#_2$ | 77.78 | 00000111 |
| 8 | $E_2$ | 82.41 | 00001000 |
| 9 | $F_2$ | 87.31 | 00001001 |
| 10 | $F\#_2$ | 92.50 | 00001010 |
| 11 | $G_2$ | 98.00 | 00001011 |
| 12 | $G\#_2$ | 103.83 | 00001100 |
| 13 | $A_2$ | 110.00 | 00001101 |
| 14 | $A\#_2$ | 116.54 | 00001110 |
| 15 | $B_2$ | 123.47 | 00001111 |
| 16 | $C_3$ | 130.81 | 00010000 |
| 17 | $C\#_3$ | 138.59 | 00010001 |
| 18 | $D_3$ | 146.83 | 00010010 |
| 19 | $D\#_3$ | 155.56 | 00010011 |
| 20 | $E_3$ | 164.81 | 00010100 |
| 21 | $F_3$ | 174.61 | 00010101 |
| 22 | $F\#_3$ | 185.00 | 00010110 |
| 23 | $G_3$ | 196.00 | 00010111 |
| 24 | $G\#_3$ | 207.65 | 00011000 |
| 25 | $A_3$ | 220.00 | 00011001 |
| 26 | $A\#_3$ | 233.08 | 00011010 |
| 27 | $B_3$ | 246.94 | 00011011 |
| 28 | $C_4$ | 261.63 | 00011100 |
| 29 | $C\#_4$ | 277.18 | 00011101 |
| 30 | $D_4$ | 293.66 | 00011110 |
| 31 | $D\#_4$ | 311.13 | 00011111 |
| 32 | $E_4$ | 329.63 | 00100000 |
| 33 | $F_4$ | 349.23 | 00100001 |
| 34 | $F\#_4$ | 369.99 | 00100010 |
| 35 | $G_4$ | 392.00 | 00100011 |
| 36 | $G\#_4$ | 415.30 | 00100100 |
| 37 | $A_4$ | 440.00 | 00100101 |
| 38 | $A\#_4$ | 466.16 | 00100110 |
| 39 | $B_4$ | 493.88 | 00100111 |
| 40 | $C_5$ | 523.25 | 00101000 |
| 41 | $C\#_5$ | 554.37 | 00101001 |
| 42 | $D_5$ | 587.33 | 00101010 |
| 43 | $D\#_5$ | 622.25 | 00101011 |
| 44 | $E_5$ | 659.26 | 00101100 |
| 45 | $F_5$ | 698.46 | 00101101 |
| 46 | $F\#_5$ | 739.99 | 00101110 |
| 47 | $G_5$ | 783.99 | 00101111 |
| 48 | $G\#_5$ | 830.61 | 00110000 |
| 49 | $A_5$ | 880.00 | 00110001 |
| 50 | $A\#_5$ | 932.33 | 00110010 |
| 51 | $B_5$ | 987.77 | 00110011 |
| 52 | $C_6$ | 1046.50 | 00110100 |
| 53 | $C\#_6$ | 1108.73 | 00110101 |
| 54 | $D_6$ | 1174.66 | 00110110 |
| 55 | $D\#_6$ | 1244.51 | 00110111 |
| 56 | $E_6$ | 1318.51 | 00111000 |
| 57 | $F_6$ | 1396.91 | 00111001 |
| 58 | $F\#_6$ | 1479.98 | 00111010 |
| 59 | $G_6$ | 1567.98 | 00111011 |
| 60 | $G\#_6$ | 1661.22 | 00111100 |

* * * * *